(12) United States Patent
Imes et al.

(10) Patent No.: US 10,063,499 B2
(45) Date of Patent: Aug. 28, 2018

(54) NON-CLOUD BASED COMMUNICATION PLATFORM FOR AN ENVIRONMENT CONTROL SYSTEM

(71) Applicant: SAMSUNG ELECTRONICS CO., LTD., Suwon-si, Gyeonggi-do (KR)

(72) Inventors: Kevin R. Imes, Austin, TX (US); James Hollister, Round Rock, TX (US); Colby White, Austin, TX (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 498 days.

(21) Appl. No.: 14/201,483

(22) Filed: Mar. 7, 2014

(65) Prior Publication Data

US 2014/0297766 A1    Oct. 2, 2014

Related U.S. Application Data

(60) Provisional application No. 61/774,394, filed on Mar. 7, 2013.

(51) Int. Cl.
*G06F 15/16* (2006.01)
*H04L 12/58* (2006.01)

(52) U.S. Cl.
CPC .................................. *H04L 51/04* (2013.01)

(58) Field of Classification Search
None
See application file for complete search history.

(56) References Cited

U.S. PATENT DOCUMENTS

| 1,568,584 A | 1/1926 | Blankenship |
| 2,042,633 A | 6/1936 | Richardson |
| 2,427,965 A | 9/1947 | Henderson |
| 2,931,006 A | 3/1960 | Klumpp, Jr. |
| 2,960,677 A | 11/1960 | Stearn et al. |
| 3,194,957 A | 7/1965 | Caldwell et al. |
| 3,237,148 A | 2/1966 | Ege |

(Continued)

FOREIGN PATENT DOCUMENTS

| EP | 1814260 A2 | 8/2007 |
| JP | H0879840 A | 3/1996 |

(Continued)

OTHER PUBLICATIONS

Peffer, T., et al. "A Tale of Two Houses: The Human Dimension of Demand Response Enabling Technology from a Case Study of an Adaptive Wireless Thermostat," ACEEE Summer Study on Energy Efficiency in Buildings, 2008.

(Continued)

*Primary Examiner* — Krista Zele
*Assistant Examiner* — Mohammad Yousuf A Mian
(74) *Attorney, Agent, or Firm* — Staas & Halsey LLP

(57) ABSTRACT

An environment management system includes a communication platform disposed remote from a site, and at least one client associated with the site. The communication platform includes at least one external XMPP server communicatively coupled with the at least one client via an instant message communication stream, and the at least one external XMPP server is configured to utilize an Extensible Message Presence Protocol (XMPP) standard to communicate with and alter an operating condition of said at least one client at the site.

17 Claims, 2 Drawing Sheets

(56) References Cited

U.S. PATENT DOCUMENTS

| | | |
|---|---|---|
| 3,531,759 A | 9/1970 | Hansen |
| 3,675,183 A | 7/1972 | Drake |
| 3,808,602 A | 4/1974 | Hoeffel et al. |
| 4,407,447 A | 10/1983 | Sayegh |
| 4,437,716 A | 3/1984 | Cooper |
| 4,497,031 A | 1/1985 | Froehling et al. |
| 4,645,286 A | 2/1987 | Isban et al. |
| 5,127,575 A | 7/1992 | Beerbaum |
| 5,274,571 A | 12/1993 | Hesse et al. |
| 5,289,362 A | 2/1994 | Liebl et al. |
| 5,461,390 A | 10/1995 | Hoshen |
| 5,476,221 A | 12/1995 | Seymour |
| 5,537,339 A | 7/1996 | Naganuma et al. |
| 5,544,036 A | 8/1996 | Brown, Jr. et al. |
| 5,566,084 A | 10/1996 | Cmar |
| 5,595,342 A | 1/1997 | McNair et al. |
| 5,682,949 A | 11/1997 | Ratcliffe et al. |
| 5,725,148 A | 3/1998 | Hartman |
| 5,729,442 A | 3/1998 | Frantz |
| 5,764,146 A | 6/1998 | Baldwin et al. |
| 5,812,949 A | 9/1998 | Taketsugu |
| 5,819,840 A | 10/1998 | Wilson et al. |
| 5,884,072 A | 3/1999 | Rasmussen |
| 5,964,625 A | 10/1999 | Farley |
| 5,987,379 A | 11/1999 | Smith |
| 6,014,080 A | 1/2000 | Layson, Jr. |
| 6,073,019 A | 6/2000 | Lowdon |
| 6,108,614 A | 8/2000 | Lincoln et al. |
| 6,128,661 A | 10/2000 | Flanagin et al. |
| 6,175,078 B1 | 1/2001 | Bambardekar et al. |
| 6,353,180 B1 | 3/2002 | Debartolo, Jr. et al. |
| 6,400,956 B1 | 6/2002 | Richton |
| 6,442,639 B1 | 8/2002 | McElhattan |
| 6,478,233 B1 | 11/2002 | Shah |
| 6,483,028 B2 | 11/2002 | Debartolo, Jr. et al. |
| 6,553,418 B1 | 4/2003 | Collins et al. |
| 6,623,311 B1 | 9/2003 | Dehan |
| 6,636,893 B1 | 10/2003 | Fong |
| 6,684,087 B1 | 1/2004 | Yu et al. |
| 6,785,542 B1 | 8/2004 | Blight et al. |
| 6,785,630 B2 | 8/2004 | Kolk et al. |
| 6,850,252 B1 | 2/2005 | Hoffberg |
| 6,868,293 B1 | 3/2005 | Schurr et al. |
| 6,975,958 B2 | 12/2005 | Bohrer et al. |
| 6,976,366 B2 | 12/2005 | Starling et al. |
| 6,980,659 B1 | 12/2005 | Beyda et al. |
| 6,999,757 B2 | 2/2006 | Bates et al. |
| 7,016,751 B2 | 3/2006 | Nordquist et al. |
| 7,031,945 B1 | 4/2006 | Donner |
| 7,082,460 B2 | 7/2006 | Hansen et al. |
| 7,083,109 B2 | 8/2006 | Pouchak |
| 7,099,483 B2 | 8/2006 | Inagaki |
| 7,114,554 B2 | 10/2006 | Bergman et al. |
| 7,127,328 B2 | 10/2006 | Ransom |
| 7,127,734 B1 | 10/2006 | Amit |
| 7,130,719 B2 | 10/2006 | Ehlers et al. |
| 7,139,564 B2 | 11/2006 | Hebert |
| 7,140,551 B2 | 11/2006 | De Pauw et al. |
| 7,155,305 B2 | 12/2006 | Hayes et al. |
| 7,159,789 B2 | 1/2007 | Schwendinger et al. |
| 7,188,003 B2 | 3/2007 | Ransom et al. |
| 7,197,011 B2 | 3/2007 | Fong |
| 7,216,021 B2 | 5/2007 | Matsubara et al. |
| 7,222,800 B2 | 5/2007 | Wruck |
| 7,224,966 B2 | 5/2007 | Caspi et al. |
| 7,257,397 B2 | 8/2007 | Shamoon et al. |
| 7,343,226 B2 | 3/2008 | Ehlers et al. |
| 7,349,761 B1 | 3/2008 | Cruse |
| 7,363,053 B2 | 4/2008 | Dalton et al. |
| 7,403,838 B2 | 7/2008 | Deen et al. |
| 7,444,401 B1 | 10/2008 | Keyghobad et al. |
| 7,451,017 B2 | 11/2008 | McNally |
| 7,460,827 B2 | 12/2008 | Schuster et al. |
| 7,477,617 B2 | 1/2009 | Chen et al. |
| 7,510,126 B2 | 3/2009 | Rossi et al. |
| 7,525,425 B2 | 4/2009 | Diem |
| 7,526,539 B1 | 4/2009 | Hsu |
| 7,554,437 B2 | 6/2009 | Axelsen |
| 7,565,225 B2 | 7/2009 | Dushane |
| 7,567,844 B2 | 7/2009 | Thomas et al. |
| 7,574,208 B2 | 8/2009 | Hanson et al. |
| 7,574,283 B2 | 8/2009 | Wang et al. |
| 7,590,703 B2 | 9/2009 | Cashman et al. |
| 7,644,591 B2 | 1/2010 | Singh et al. |
| 7,665,670 B2 | 2/2010 | Ahmed |
| 7,668,532 B2 | 2/2010 | Shamoon et al. |
| 7,671,544 B2 | 3/2010 | Clark et al. |
| 7,693,581 B2 | 4/2010 | Callaghan et al. |
| 7,706,928 B1 | 4/2010 | Howell et al. |
| 7,715,951 B2 | 5/2010 | Forbes et al. |
| 7,747,739 B2 | 6/2010 | Bridges et al. |
| 7,752,309 B2 | 7/2010 | Keyghobad et al. |
| 7,761,910 B2 | 7/2010 | Ransom |
| 7,775,453 B2 | 8/2010 | Hara |
| 7,783,738 B2 | 8/2010 | Keyghobad et al. |
| 7,792,946 B2 | 9/2010 | Keyghobad et al. |
| 7,798,417 B2 | 9/2010 | Snyder et al. |
| 7,812,766 B2 | 10/2010 | Leblanc et al. |
| 7,813,831 B2 | 10/2010 | McCoy et al. |
| 7,865,252 B2 | 1/2011 | Clayton |
| 7,881,816 B2 | 2/2011 | Mathiesen et al. |
| 7,884,727 B2 | 2/2011 | Tran |
| 7,886,166 B2 | 2/2011 | Schnekendorf et al. |
| 7,895,257 B2 | 2/2011 | Helal et al. |
| 7,908,019 B2 | 3/2011 | Ebrom et al. |
| 7,908,116 B2 | 3/2011 | Steinberg et al. |
| 7,908,117 B2 | 3/2011 | Steinberg et al. |
| 7,912,559 B2 | 3/2011 | McCoy et al. |
| 7,917,914 B2 | 3/2011 | McCoy et al. |
| 7,918,406 B2 | 4/2011 | Rosen |
| 7,921,429 B2 | 4/2011 | McCoy et al. |
| 7,941,530 B2 | 5/2011 | Ha et al. |
| 7,949,615 B2 | 5/2011 | Ehlers et al. |
| 7,953,518 B2 | 5/2011 | Kansal et al. |
| 7,973,707 B2 | 7/2011 | Verechtchiagine |
| 7,975,051 B2 | 7/2011 | Saint Clair et al. |
| 7,979,163 B2 | 7/2011 | Terlson et al. |
| 8,005,780 B2 | 8/2011 | McCoy et al. |
| 8,010,237 B2 | 8/2011 | Cheung et al. |
| 8,010,418 B1 | 8/2011 | Lee |
| 8,010,812 B2 | 8/2011 | Forbes, Jr. et al. |
| 8,019,445 B2 | 9/2011 | Marhoefer |
| 8,024,073 B2 | 9/2011 | Imes et al. |
| 8,028,049 B1 | 9/2011 | Ellis et al. |
| 8,028,302 B2 | 9/2011 | Glotzbach et al. |
| 8,032,233 B2 | 10/2011 | Forbes, Jr. et al. |
| 8,042,048 B2 | 10/2011 | Wilson et al. |
| 8,049,592 B2 | 11/2011 | Wang et al. |
| 8,063,775 B2 | 11/2011 | Reed et al. |
| 8,082,065 B2 | 12/2011 | Imes et al. |
| 8,090,477 B1 | 1/2012 | Steinberg |
| 8,091,765 B2 | 1/2012 | Jiang et al. |
| 8,091,795 B1 | 1/2012 | McLellan et al. |
| 8,099,195 B2 | 1/2012 | Imes et al. |
| 8,099,198 B2 | 1/2012 | Gurin |
| 8,108,076 B2 | 1/2012 | Imes et al. |
| 8,117,299 B2 | 2/2012 | Narayanaswami et al. |
| 8,126,685 B2 | 2/2012 | Nasle |
| 8,131,401 B2 | 3/2012 | Nasle |
| 8,140,279 B2 | 3/2012 | Subbloie |
| 8,140,667 B2 | 3/2012 | Keyghobad et al. |
| 8,176,112 B2 | 5/2012 | Hicks, IIII et al. |
| 8,204,979 B2 | 6/2012 | Vutharkar et al. |
| 8,214,270 B2 | 7/2012 | Schaefer et al. |
| 8,280,556 B2 | 10/2012 | Besore et al. |
| 8,306,634 B2 | 11/2012 | Nguyen et al. |
| 8,350,694 B1 | 1/2013 | Trundle et al. |
| 8,355,865 B2 | 1/2013 | Wagner et al. |
| 8,406,783 B2 | 3/2013 | Eitan et al. |
| 8,406,933 B2 | 3/2013 | Nagel et al. |
| 2002/0073217 A1 | 6/2002 | Ma et al. |
| 2002/0147006 A1 | 10/2002 | Coon et al. |
| 2002/0194500 A1 | 12/2002 | Bajikar |
| 2002/0196151 A1 | 12/2002 | Troxler |

(56) References Cited

U.S. PATENT DOCUMENTS

| | | |
|---|---|---|
| 2002/0198984 A1 | 12/2002 | Goldstein et al. |
| 2003/0120817 A1 | 6/2003 | Ott et al. |
| 2003/0122684 A1 | 7/2003 | Porter et al. |
| 2003/0149734 A1 | 8/2003 | Aaltonen et al. |
| 2003/0210126 A1 | 11/2003 | Kanazawa |
| 2004/0034484 A1 | 2/2004 | Solomita, Jr. et al. |
| 2004/0078153 A1 | 4/2004 | Bartone et al. |
| 2004/0087314 A1 | 5/2004 | Duncan |
| 2004/0119600 A1 | 6/2004 | Hampton |
| 2004/0133314 A1 | 7/2004 | Ehlers et al. |
| 2004/0193329 A1 | 9/2004 | Ransom et al. |
| 2005/0038326 A1 | 2/2005 | Mathur |
| 2005/0040247 A1 | 2/2005 | Pouchak |
| 2005/0040250 A1 | 2/2005 | Wruck |
| 2005/0044427 A1 | 2/2005 | Dunstan et al. |
| 2005/0060575 A1 | 3/2005 | Trethewey et al. |
| 2005/0090267 A1 | 4/2005 | Kotzin |
| 2005/0131583 A1 | 6/2005 | Ransom |
| 2005/0143863 A1 | 6/2005 | Ruane et al. |
| 2005/0144437 A1 | 6/2005 | Ransom et al. |
| 2005/0172056 A1 | 8/2005 | Ahn |
| 2005/0194457 A1 | 9/2005 | Dolan |
| 2005/0242945 A1 | 11/2005 | Perkinson |
| 2005/0246561 A1 | 11/2005 | Wu et al. |
| 2006/0012489 A1 | 1/2006 | Yokota et al. |
| 2006/0063522 A1 | 3/2006 | McFarland |
| 2006/0097063 A1 | 5/2006 | Zeevi |
| 2006/0099971 A1 | 5/2006 | Staton et al. |
| 2006/0102732 A1 | 5/2006 | Garrett et al. |
| 2006/0122715 A1 | 6/2006 | Schroeder et al. |
| 2006/0161635 A1 | 7/2006 | Lamkin et al. |
| 2006/0179079 A1 | 8/2006 | Kolehmainen |
| 2006/0253894 A1 | 11/2006 | Bookman et al. |
| 2006/0265489 A1 | 11/2006 | Moore |
| 2006/0276175 A1 | 12/2006 | Chandran |
| 2006/0283965 A1 | 12/2006 | Mueller et al. |
| 2007/0032225 A1 | 2/2007 | Konicek et al. |
| 2007/0037554 A1 | 2/2007 | Feeny |
| 2007/0037605 A1 | 2/2007 | Logan |
| 2007/0043477 A1 | 2/2007 | Ehlers et al. |
| 2007/0043478 A1 | 2/2007 | Ehlers et al. |
| 2007/0045431 A1 | 3/2007 | Chapman et al. |
| 2007/0054616 A1 | 3/2007 | Culbert |
| 2007/0055760 A1 | 3/2007 | McCoy et al. |
| 2007/0060171 A1 | 3/2007 | Sudit et al. |
| 2007/0061050 A1 | 3/2007 | Hoffknecht |
| 2007/0061266 A1 | 3/2007 | Moore et al. |
| 2007/0061487 A1 | 3/2007 | Moore et al. |
| 2007/0112939 A1 | 5/2007 | Wilson et al. |
| 2007/0114295 A1 | 5/2007 | Jenkins |
| 2007/0115902 A1 | 5/2007 | Shamoon et al. |
| 2007/0124026 A1 | 5/2007 | Troxell et al. |
| 2007/0136217 A1 | 6/2007 | Johnson et al. |
| 2007/0155401 A1 | 7/2007 | Ward et al. |
| 2007/0156265 A1 | 7/2007 | McCoy et al. |
| 2007/0156864 A1 | 7/2007 | McCoy et al. |
| 2007/0156882 A1 | 7/2007 | McCoy et al. |
| 2007/0158442 A1 | 7/2007 | Chapman et al. |
| 2007/0160022 A1 | 7/2007 | McCoy et al. |
| 2007/0162158 A1 | 7/2007 | McCoy et al. |
| 2007/0168486 A1 | 7/2007 | McCoy et al. |
| 2007/0176771 A1 | 8/2007 | Doyle |
| 2007/0188319 A1 | 8/2007 | Upton |
| 2007/0197236 A1 | 8/2007 | Ahn et al. |
| 2007/0221741 A1 | 9/2007 | Wagner et al. |
| 2007/0240173 A1 | 10/2007 | McCoy et al. |
| 2007/0241203 A1 | 10/2007 | Wagner et al. |
| 2007/0249319 A1 | 10/2007 | Faulkner et al. |
| 2007/0273307 A1 | 11/2007 | Westrick et al. |
| 2007/0274241 A1 | 11/2007 | Brothers |
| 2007/0282748 A1 | 12/2007 | Saint Clair et al. |
| 2007/0285510 A1 | 12/2007 | Lipton et al. |
| 2007/0287410 A1 | 12/2007 | Bae et al. |
| 2007/0287473 A1 | 12/2007 | Dupary |
| 2007/0288610 A1 | 12/2007 | Saint Clair et al. |
| 2007/0288975 A1 | 12/2007 | Cashman et al. |
| 2008/0004904 A1 | 1/2008 | Tran |
| 2008/0017722 A1 | 1/2008 | Snyder et al. |
| 2008/0046878 A1 | 2/2008 | Anderson |
| 2008/0082838 A1 | 4/2008 | Achariyakosol et al. |
| 2008/0099568 A1 | 5/2008 | Nicodem et al. |
| 2008/0103610 A1 | 5/2008 | Ebrom et al. |
| 2008/0104208 A1 | 5/2008 | Ebrom et al. |
| 2008/0104212 A1 | 5/2008 | Ebrom et al. |
| 2008/0109830 A1 | 5/2008 | Giozbach et al. |
| 2008/0127325 A1 | 5/2008 | Ebrom et al. |
| 2008/0137670 A1 | 6/2008 | Ebrom et al. |
| 2008/0177678 A1 | 7/2008 | Di Martini et al. |
| 2008/0177994 A1 | 7/2008 | Mayer |
| 2008/0188963 A1 | 8/2008 | McCoy |
| 2008/0218307 A1 | 9/2008 | Schoettle |
| 2008/0219186 A1 | 9/2008 | Bell et al. |
| 2008/0219227 A1 | 9/2008 | Michaelis |
| 2008/0219239 A1 | 9/2008 | Bell et al. |
| 2008/0221737 A1 | 9/2008 | Josephson et al. |
| 2008/0249642 A1 | 10/2008 | Chen |
| 2008/0262820 A1 | 10/2008 | Nasle |
| 2008/0270562 A1 | 10/2008 | Jin et al. |
| 2008/0271123 A1 | 10/2008 | Ollis et al. |
| 2008/0272934 A1 | 11/2008 | Wang et al. |
| 2008/0277486 A1 | 11/2008 | Seem et al. |
| 2008/0277487 A1 | 11/2008 | Mueller et al. |
| 2008/0281472 A1 | 11/2008 | Podgorny et al. |
| 2008/0281666 A1 | 11/2008 | Kessman et al. |
| 2008/0291855 A1 | 11/2008 | Bata et al. |
| 2008/0305644 A1 | 12/2008 | Noda et al. |
| 2008/0313310 A1 | 12/2008 | Vasa et al. |
| 2009/0001182 A1 | 1/2009 | Siddaramanna et al. |
| 2009/0005061 A1 | 1/2009 | Ward et al. |
| 2009/0012704 A1 | 1/2009 | Franco et al. |
| 2009/0037938 A1 | 2/2009 | Frank |
| 2009/0062970 A1 | 3/2009 | Forbes, Jr. et al. |
| 2009/0063122 A1 | 3/2009 | Nasle |
| 2009/0063228 A1 | 3/2009 | Forbes, Jr. et al. |
| 2009/0065596 A1 | 3/2009 | Seem et al. |
| 2009/0076749 A1 | 3/2009 | Nasle |
| 2009/0082888 A1 | 3/2009 | Johansen |
| 2009/0083167 A1 | 3/2009 | Subbloie |
| 2009/0093688 A1 | 4/2009 | Mathur |
| 2009/0098857 A1 | 4/2009 | De Atley |
| 2009/0098880 A1 | 4/2009 | Lindquist |
| 2009/0100492 A1 | 4/2009 | Hicks, III et al. |
| 2009/0103535 A1 | 4/2009 | McCoy et al. |
| 2009/0112522 A1 | 4/2009 | Rasmussen |
| 2009/0113037 A1 | 4/2009 | Pouchak |
| 2009/0129301 A1 | 5/2009 | Belimpasakis |
| 2009/0132070 A1 | 5/2009 | Ebrom et al. |
| 2009/0135836 A1 | 5/2009 | Veillette |
| 2009/0138099 A1 | 5/2009 | Veillette |
| 2009/0157529 A1 | 6/2009 | Ehlers et al. |
| 2009/0160626 A1 | 6/2009 | Jeon et al. |
| 2009/0164049 A1 | 6/2009 | Nibler et al. |
| 2009/0187499 A1 | 7/2009 | Mulder et al. |
| 2009/0193217 A1 | 7/2009 | Korecki et al. |
| 2009/0195349 A1 | 8/2009 | Frader-Thompson et al. |
| 2009/0204837 A1 | 8/2009 | Raval et al. |
| 2009/0240381 A1 | 9/2009 | Lane |
| 2009/0248702 A1 | 10/2009 | Schwartz et al. |
| 2009/0267787 A1 | 10/2009 | Pryor et al. |
| 2009/0270138 A1 | 10/2009 | Raveendran |
| 2009/0302994 A1 | 12/2009 | Rhee et al. |
| 2009/0305644 A1 | 12/2009 | Rhee et al. |
| 2009/0312968 A1 | 12/2009 | Phillips et al. |
| 2009/0316671 A1 | 12/2009 | Rolf et al. |
| 2010/0017126 A1 | 1/2010 | Holcman et al. |
| 2010/0034386 A1 | 2/2010 | Choong et al. |
| 2010/0035587 A1 | 2/2010 | Bennett |
| 2010/0035613 A1 | 2/2010 | Schroter |
| 2010/0063867 A1 | 3/2010 | Proctor, Jr. et al. |
| 2010/0066507 A1 | 3/2010 | Myllymaeki |
| 2010/0069035 A1 | 3/2010 | Johnson |
| 2010/0069087 A1 | 3/2010 | Chow et al. |
| 2010/0070100 A1 | 3/2010 | Finlinson et al. |
| 2010/0070101 A1 | 3/2010 | Benes et al. |

(56) References Cited

U.S. PATENT DOCUMENTS

| | | |
|---|---|---|
| 2010/0075656 A1 | 3/2010 | Howarter et al. |
| 2010/0081375 A1 | 4/2010 | Rosenblatt et al. |
| 2010/0081468 A1 | 4/2010 | Brothers |
| 2010/0082174 A1 | 4/2010 | Weaver |
| 2010/0082176 A1 | 4/2010 | Chang |
| 2010/0082431 A1 | 4/2010 | Ramer et al. |
| 2010/0087932 A1 | 4/2010 | McCoy et al. |
| 2010/0088261 A1 | 4/2010 | Montalvo |
| 2010/0094475 A1 | 4/2010 | Masters et al. |
| 2010/0094737 A1 | 4/2010 | Lambird |
| 2010/0099410 A1 | 4/2010 | Sweeney et al. |
| 2010/0100253 A1 | 4/2010 | Fausak et al. |
| 2010/0113061 A1 | 5/2010 | Holcman |
| 2010/0115314 A1 | 5/2010 | Sultenfuss |
| 2010/0121499 A1 | 5/2010 | Besore et al. |
| 2010/0123414 A1 | 5/2010 | Antonopoulos |
| 2010/0127854 A1 | 5/2010 | Helvick et al. |
| 2010/0127889 A1 | 5/2010 | Vogel et al. |
| 2010/0130178 A1 | 5/2010 | Bennett et al. |
| 2010/0130213 A1 | 5/2010 | Vendrow et al. |
| 2010/0138764 A1 | 6/2010 | Hatambeiki et al. |
| 2010/0141437 A1 | 6/2010 | Karam et al. |
| 2010/0145534 A1 | 6/2010 | Forbes, Jr. et al. |
| 2010/0152997 A1 | 6/2010 | De Silva et al. |
| 2010/0156665 A1 | 6/2010 | Krzyzanowski et al. |
| 2010/0159936 A1 | 6/2010 | Brisbois et al. |
| 2010/0161148 A1 | 6/2010 | Forbes, Jr. et al. |
| 2010/0161149 A1 | 6/2010 | Nguyen et al. |
| 2010/0164713 A1 | 7/2010 | Wedig et al. |
| 2010/0165861 A1 | 7/2010 | Rrdland et al. |
| 2010/0169030 A1 | 7/2010 | Parlos et al. |
| 2010/0174643 A1 | 7/2010 | Schaefer et al. |
| 2010/0179670 A1 | 7/2010 | Forbes, Jr. et al. |
| 2010/0179672 A1 | 7/2010 | Beckmann et al. |
| 2010/0179708 A1 | 7/2010 | Watson et al. |
| 2010/0187219 A1 | 7/2010 | Besore et al. |
| 2010/0188239 A1 | 7/2010 | Rockwell |
| 2010/0188279 A1 | 7/2010 | Shamilian et al. |
| 2010/0191352 A1 | 7/2010 | Quail |
| 2010/0193592 A1 | 8/2010 | Simon et al. |
| 2010/0198713 A1 | 8/2010 | Forbes, Jr. et al. |
| 2010/0207728 A1 | 8/2010 | Roscoe et al. |
| 2010/0217450 A1 | 8/2010 | Beal et al. |
| 2010/0217451 A1 | 8/2010 | Kouda et al. |
| 2010/0217452 A1 | 8/2010 | McCord et al. |
| 2010/0217549 A1 | 8/2010 | Galvin et al. |
| 2010/0217550 A1 | 8/2010 | Crabtree et al. |
| 2010/0217642 A1 | 8/2010 | Crabtree et al. |
| 2010/0217651 A1 | 8/2010 | Crabtree et al. |
| 2010/0217837 A1 | 8/2010 | Ansari et al. |
| 2010/0218108 A1 | 8/2010 | Crabtree et al. |
| 2010/0222935 A1 | 9/2010 | Forbes, Jr. et al. |
| 2010/0228854 A1 | 9/2010 | Morrison et al. |
| 2010/0235008 A1 | 9/2010 | Forbes, Jr. et al. |
| 2010/0241275 A1 | 9/2010 | Crawford et al. |
| 2010/0249955 A1 | 9/2010 | Sitton |
| 2010/0250590 A1 | 9/2010 | Galvin |
| 2010/0256823 A1 | 10/2010 | Cherukuri et al. |
| 2010/0257539 A1 | 10/2010 | Narayanan et al. |
| 2010/0261465 A1 | 10/2010 | Rhoads et al. |
| 2010/0262298 A1 | 10/2010 | Johnson et al. |
| 2010/0262299 A1 | 10/2010 | Cheung et al. |
| 2010/0262336 A1 | 10/2010 | Rivas et al. |
| 2010/0272192 A1 | 10/2010 | Varadarajan et al. |
| 2010/0289643 A1 | 11/2010 | Trundle et al. |
| 2010/0299265 A1 | 11/2010 | Walters et al. |
| 2010/0299517 A1 | 11/2010 | Jukic et al. |
| 2010/0305773 A1 | 12/2010 | Cohen |
| 2010/0315235 A1 | 12/2010 | Adegoke et al. |
| 2010/0315438 A1 | 12/2010 | Horodezky et al. |
| 2010/0317332 A1 | 12/2010 | Bathiche et al. |
| 2010/0317371 A1 | 12/2010 | Westerinen et al. |
| 2010/0318198 A1 | 12/2010 | Smith et al. |
| 2010/0324956 A1 | 12/2010 | Lopez et al. |
| 2010/0324962 A1 | 12/2010 | Nesler et al. |
| 2010/0332373 A1 | 12/2010 | Crabtree et al. |
| 2011/0004350 A1 | 1/2011 | Cheifetz et al. |
| 2011/0004355 A1 | 1/2011 | Wang et al. |
| 2011/0004513 A1 | 1/2011 | Hoffberg |
| 2011/0015797 A1 | 1/2011 | Gilstrap |
| 2011/0015802 A1 | 1/2011 | Imes |
| 2011/0016023 A1 | 1/2011 | Zakas |
| 2011/0022239 A1 | 1/2011 | Forbes, Jr. et al. |
| 2011/0022242 A1 | 1/2011 | Bukhin et al. |
| 2011/0029655 A1 | 2/2011 | Forbes, Jr. et al. |
| 2011/0039518 A1 | 2/2011 | Maria |
| 2011/0040666 A1 | 2/2011 | Crabtree et al. |
| 2011/0046792 A1 | 2/2011 | Imes et al. |
| 2011/0046798 A1 | 2/2011 | Imes et al. |
| 2011/0046799 A1 | 2/2011 | Imes et al. |
| 2011/0046800 A1 | 2/2011 | Imes et al. |
| 2011/0046801 A1 | 2/2011 | Imes et al. |
| 2011/0047482 A1 | 2/2011 | Arthurs et al. |
| 2011/0051823 A1 | 3/2011 | Imes et al. |
| 2011/0054699 A1 | 3/2011 | Imes et al. |
| 2011/0054710 A1 | 3/2011 | Imes et al. |
| 2011/0055893 A1* | 3/2011 | Walls ................. H04L 65/1069 726/3 |
| 2011/0061014 A1 | 3/2011 | Frader-Thompson et al. |
| 2011/0063126 A1 | 3/2011 | Kennedy et al. |
| 2011/0063999 A1 | 3/2011 | Erdmann et al. |
| 2011/0069719 A1 | 3/2011 | Fries, IV et al. |
| 2011/0077789 A1 | 3/2011 | Sun |
| 2011/0098869 A1 | 4/2011 | Seo et al. |
| 2011/0106326 A1 | 5/2011 | Anunobi et al. |
| 2011/0106327 A1 | 5/2011 | Zhou et al. |
| 2011/0106681 A1 | 5/2011 | Cockerell et al. |
| 2011/0113090 A1 | 5/2011 | Peeri |
| 2011/0115875 A1 | 5/2011 | Sadwick et al. |
| 2011/0117878 A1 | 5/2011 | Barash et al. |
| 2011/0117927 A1 | 5/2011 | Doyle |
| 2011/0138024 A1 | 6/2011 | Chen et al. |
| 2011/0148626 A1 | 6/2011 | Acevedo |
| 2011/0153525 A1 | 6/2011 | Benco et al. |
| 2011/0160881 A1 | 6/2011 | Grey |
| 2011/0172837 A1 | 7/2011 | Forbes, Jr. |
| 2011/0173542 A1 | 7/2011 | Imes et al. |
| 2011/0202185 A1 | 8/2011 | Imes et al. |
| 2011/0202195 A1 | 8/2011 | Finch et al. |
| 2011/0202293 A1 | 8/2011 | Kobraei et al. |
| 2011/0211584 A1 | 9/2011 | Mahmoud |
| 2011/0214060 A1 | 9/2011 | Imes et al. |
| 2011/0224838 A1 | 9/2011 | Imes et al. |
| 2011/0227704 A1 | 9/2011 | Padmanabhan et al. |
| 2011/0231020 A1 | 9/2011 | Ramachandran et al. |
| 2011/0246606 A1 | 10/2011 | Barbeau et al. |
| 2011/0246898 A1 | 10/2011 | Imes et al. |
| 2011/0251725 A1 | 10/2011 | Chan |
| 2011/0257809 A1 | 10/2011 | Forbes, Jr. et al. |
| 2011/0258022 A1 | 10/2011 | Forbes, Jr. et al. |
| 2011/0264290 A1 | 10/2011 | Drew |
| 2011/0264296 A1 | 10/2011 | Drake et al. |
| 2011/0282497 A1 | 11/2011 | Josephson et al. |
| 2011/0295393 A1 | 12/2011 | Lindahl |
| 2011/0296169 A1 | 12/2011 | Palmer |
| 2011/0302320 A1* | 12/2011 | Dunstan ............ G06F 17/30017 709/235 |
| 2011/0302431 A1 | 12/2011 | Diab et al. |
| 2011/0307101 A1 | 12/2011 | Imes et al. |
| 2011/0316664 A1 | 12/2011 | Olcott et al. |
| 2012/0022709 A1 | 1/2012 | Taylor |
| 2012/0061480 A1 | 3/2012 | Deligiannis et al. |
| 2012/0117168 A1* | 5/2012 | Sugiyama ............ G06F 9/5055 709/206 |
| 2012/0126020 A1 | 5/2012 | Filson et al. |
| 2012/0169249 A1 | 7/2012 | Loveland et al. |
| 2012/0179547 A1 | 7/2012 | Besore et al. |
| 2012/0189140 A1 | 7/2012 | Hughes et al. |
| 2012/0254362 A1* | 10/2012 | Li ......................... H04W 4/025 709/218 |
| 2012/0312874 A1 | 12/2012 | Jonsson |
| 2013/0087629 A1 | 4/2013 | Stefanski et al. |
| 2013/0099010 A1 | 4/2013 | Filson et al. |

(56) References Cited

U.S. PATENT DOCUMENTS

| | | | | |
|---|---|---|---|---|
| 2013/0315231 | A1* | 11/2013 | Rist | H04Q 3/62 370/352 |
| 2014/0068044 | A1* | 3/2014 | McKinney | H04L 41/0816 709/223 |
| 2014/0378119 | A1* | 12/2014 | Witzel | H04W 4/12 455/419 |

FOREIGN PATENT DOCUMENTS

| | | | |
|---|---|---|---|
| JP | 2006092035 | A | 4/2006 |
| WO | 2002027639 | A1 | 4/2002 |
| WO | 2007109557 | A2 | 9/2007 |
| WO | 2008134460 | A1 | 11/2008 |
| WO | 2009034720 | A1 | 3/2009 |
| WO | 2009036764 | A2 | 3/2009 |
| WO | 2009067251 | A1 | 5/2009 |
| WO | 2009097400 | A1 | 8/2009 |

OTHER PUBLICATIONS

BAYweb Thermostat system.
Stigge, B. "Informed Home Energy Behavior: Developing a tool for homeowners to monitor, plan and learn about energy conservation," Massachusetts Institute of Technology, 2001.
Mozer, M., et al. The Neurothermostat: Predictive Optimal Control of Residential Heating Systems. "Advances in Neural Information Processing Systems 9." MIT Press, 1997.
Inncom e529/X529 thermostat and logic board system.
Seligman, C., et al. Behavior Approaches to Residential Energy Conservation. "Saving Energy in the Home." Ballinger Publishing Co., 1978.
Slavin, Alison Jane and Trundle, Stephen Scott, Remote Thermostat Control/Energy Monitoring, U.S. Appl. No. 61/179,224, filed May 18, 2009; 14 pages.
Gupta, Manu, A Persuasive GPS-Controlled Thermostat System, Royal Institute of Technology, Stockholm, Sweden, Jun. 2006; Pune Institute of Computer Technology, University of Pune, India, Jun. 2003 and Massachusetts Institute of Technology, Sep. 2008; 89 pages.
Gupta, Manu, Intille, Stephen S. and Larson, Kent, Adding GPS-Control to Traditional Thermostats: AN Exploration of Potential Energy Savings and Design Challenges, May 11-14, 2009; House_n. Massachusetts Institute of Technology, Cambridge, MA 02142 USA.
"A step-by-step guide to installing the 1st generation Nest Learning Thermostat," Article #1161, 2013 Nest Labs. pp. 1-6. http://http://support.nest.com/article/A-step-by-step-guide-to-installing-the-1st-generation-Nest-Learning-Thermostat, last accessed Feb. 1, 2013.
Klym et al., The Evolution of RFID Networks: The Potential for Disruptive Innovation, Mar. 2006, MIT Communication Futures Program, pp. 1-20.
Pering et al., Spontaneous Marriages of Mobile Devices and Interactive Space, Communication of the ACM, Sep. 2005, pp. 53-59.
Jaring et al., Improving Mobile Solution Workflows and Usability Using Near Field Communication Technology, 2007, Springer-Verlag Berlin Heidelberg, pp. 358-373.
"Wi-Fi", Wikipedia, printed Jul. 8, 2013.
Request Response, Wikipedia, printed Jul. 25, 2013.
Inncom International, Inc. "Installation User Manual", Revision 3.1, Sep. 12, 2006, pp. 1-36.
BAYweb Thermostat Owner's Manual, Bay Controls, LLC published Nov. 11, 2009.
e4 Smart Digital Thermostat—E529, Inncom by Honeywell, published Aug. 2012.

\* cited by examiner

NON-CLOUD BASED COMMUNICATION PLATFORM FOR AN ENVIRONMENT CONTROL SYSTEM

CROSS-REFERENCE TO RELATED APPLICATION

The subject application claims priority to U.S. Provisional Patent Application Ser. No. 61/774,394 filed on Mar. 7, 2013, directed to a "Non-Cloud Based Communication Platform for an Environmental Control System", which is hereby incorporated by reference.

FIELD OF THE DISCLOSURE

This disclosure relates to a communication platform for use with an environment control system.

BACKGROUND

Current communication platforms which are used to establish communication between a device disposed at a site and at least one server disposed remotely from the site rely on a separate gateway device to bridge communication between the site and the server. However, in order to establish communication with the server via the gateway, the current communication platforms must also deal with or manage a firewall. This is commonly known in the art as the network address translation (NAT) problem. The gateway devices of the current communication platforms must incorporate a firewall function that provides a single IP address for the site to enable communication between the site and the server. While the NAT approach does provide for a security feature for the site, the assignment of a single IP address to the site can also be problematic when the server desires to communicate directly with a device associated with the site. In other words, the use of a firewall makes it easy for a site to communicate with a server, but makes the reverse communication very difficult. In addition, the current gateway devices only create a temporary connection between the site and the server to maximize security therebetween.

In addition, current communication platforms must utilize a polling approach to establish communication between the site and the server wherein the gateway device polls an associated server during the temporary connection to determine if a message or data is desired to be sent from the server to the site. Since this communication can only occur while the temporary connection is open, the current communication platforms which utilize a polling approach have a latency problem. In other words, a message or data which is desired to be sent from the server to the site cannot be sent instantaneously, but rather must wait for the initiation of a polling from the gateway. Therefore, any messages or data which are sent from the server must necessarily encounter some form of a time delay, known in the art as latency, before being received at the site. This delay leads to an unsatisfactory user experience for a user who may ultimately receive or be impacted by the message or data sent to the site. In addition, the message or data received at the site may even be outdated by the time it is ultimately received at the site.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION

Figure 1:
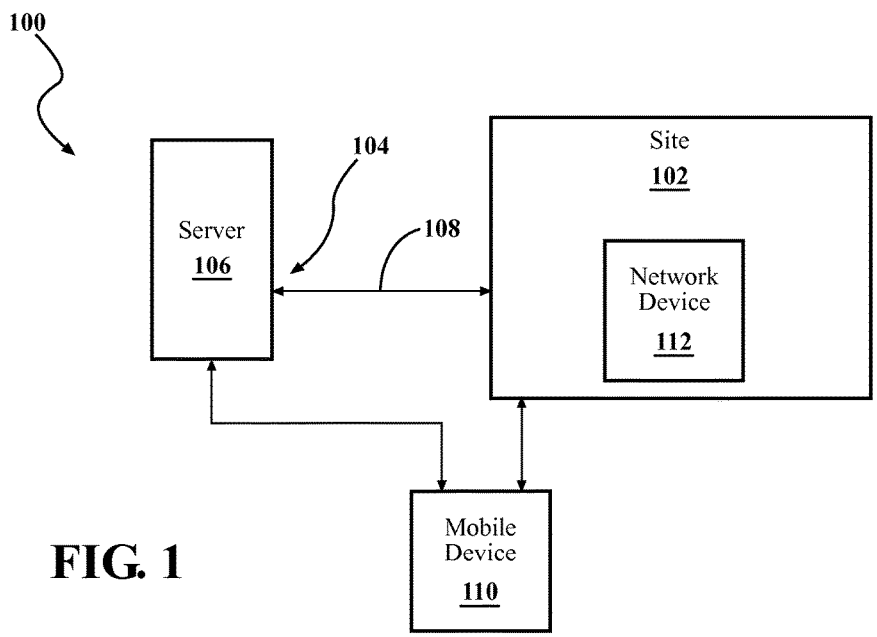
FIG. 1 illustrates a block diagram of an environment management system.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

Devices or programs that are in communication with one another need not be in continuous communication with each other unless expressly specified otherwise. In addition, devices or programs that are in communication with one another may communicate directly or indirectly through one or more intermediaries.

Embodiments discussed below describe, in part, distributed computing solutions that manage all or part of a communicative interaction between network elements. In this context, a communicative interaction may be intending to send information, sending information, requesting information, receiving information, receiving a request for information, or any combination thereof. As such, a communicative interaction could be unidirectional, bidirectional, multi-directional, or any combination thereof. In some circumstances, a communicative interaction could be relatively complex and involve two or more network elements. For example, a communicative interaction may be "a conversation" or series of related communications between a client and a server—each network element sending and receiving information to and from the other. The communicative interaction between the network elements is not necessarily limited to only one specific form. A network element may be a node, a piece of hardware, software, firmware, middleware, another component of a computing system, or any combination thereof.

For purposes of this disclosure, an environment management system, network device, or any combination thereof can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an environment management system, network device, or any combination thereof can include any combination of a personal computer, a PDA, a consumer electronic device, a media device, a smart phone, a cellular or mobile phone, a smart utility meter, an advanced metering infrastructure, a smart energy device, an energy display device, a home automation controller, an energy hub, a smart energy gateway, a set-top box, a digital media subscriber system, a cable modem, a fiber optic enabled communications device, a media gateway, a home media management system, a network server or storage device, an energy substation, a vehicle charging station, a renewable energy production device, a renewable energy control device, an energy storage management system, a smart appliance, an HVAC system, a water pump, a heat pump, a hot water heater, a thermostat, an energy controller, an irrigation system, a lighting system, an alarm system, a smart power outlet, an energy detection device, a power measurement device, a power measurement unit (PMU), an air handler, a wireless air damper, a humidity control system, a heat and motion sensing device, a smart power outlet, a switch router, wireless router, or other network communication device, or any other suitable device or system, and can vary in size, shape, performance, functionality, and price.

According to an aspect, an environment management system can include memory, one or more processing resources or controllers such as a central processing unit (CPU) or hardware or software control logic. Additional components of the environment management system can include one or more storage devices, one or more wireless, wired or any combination thereof of communications ports to communicate with external devices as well as various input and output (I/O) devices, such as a keyboard, a mouse, pointers, controllers, and display devices. The environment management system can also include one or more buses operable to transmit communications between the various hardware components, and can communicate using wireline communication data buses, wireless network communication, or any combination thereof.

As used herein, a network can include various types and variants of wireless communication configurable to manage and establish communication at a site, including associated protocols or enhancements thereto including, but not limited to, any combination or portion of, IEEE 802.15-based wireless communication, Zigbee communication, INSETEON communication, X10 communication protocol, Z-Wave communication, Bluetooth communication, WIFI communication, IEEE 802.11-based communication, WiMAX communication, IEEE 802.16-based communication, various proprietary wireless communications, or any combination thereof.

As described herein, a flow charted technique, method, or algorithm may be described in a series of sequential actions. Unless expressly stated to the contrary, the sequence of the actions and the party performing the actions may be freely changed without departing from the scope of the teachings. Actions may be added, deleted, or altered in several ways. Similarly, the actions may be re-ordered or looped. Further, although processes, methods, algorithms or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

As used herein, the terms "comprises," "comprising," "includes," "including," "has," "having" or any other variation thereof, are intended to cover a non-exclusive inclusion. For example, a process, method, article, system, or apparatus that comprises a list of features is not necessarily limited only to those features but may include other features not expressly listed or inherent to such process, method, article, system, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the computing, electronics, and software arts.

FIG. 1 illustrates a block diagram of an environment management system, illustrated generally at 100, and configured to be used with a site 102 according to an aspect of the disclosure. Site can include a residential site, an industrial site, a manufacturing site, a commercial site, or any combination thereof. According to an aspect, environment management system 100 can include a communication platform 104 which includes a server 106 located at a remote location that can be communicatively coupled to the site 102 via a communication stream 108. The server 106 can be configured in various ways, and for example can include any combination of services and capabilities including but not limited to customer engagement capabilities, energy management capabilities, environment management capabilities, information service capabilities, account management capabilities, account management capabilities, cloud based services, advertisement services, media management services, home security services, natural language processing capabilities, broadband services, update services, communication services such as instant messaging, pub-sub services, SMS services, mobile internet services, mobile gateway services, update services, mobile media services, mobile advertisement services, location based services, location based advertisement services, weather services, demand response services, utility services, application services, third party application services, or other services that can be used to manage an environment control system.

Environment management system 100 can also include a mobile device 110 operable to be used with the site 102. Accordingly to a further aspect, site 102 can include at least one network device 112 disposed at the site 102. The at least one network device 112 can be one of or any combination of an energy management system, an energy management device, a network device, a personal computer, a consumer electronic device, a media device, a smart utility meter, an advanced metering infrastructure, a smart energy device, an energy display device, a home automation controller, an energy hub, a smart energy gateway, a set-top box, a digital media subscriber system, a cable modem, a broadband communication device, a fiber optic enabled communications device, a media gateway, a home media management system, a media server, a network server, a network storage device, a wireless speaker, a customer engagement platform, a customer engagement portal, a retail energy provider's server, a wholesale energy provider's server, a COOP energy provider's server, a retail business server, a commercial site server, an industrial site server, a multi-residential site server, a temporary lodging server, a hotel server, a motel server, a condominium server, a utility provider's server, which can include waste, water, power or combinations thereof, an energy substation, a news media server, a weather server, an advertisement server or service provider, a network radio server or service provider, a network media server or service provider, a music server or server provider, a search engine server or service provider, an information server or service provider, a wireless information network device, a vehicle charging station, a renewable energy production device, a renewable energy control device, an energy storage management system, a smart appliance, an HVAC system, a water pump, a heat pump, a hot water heater, a thermostat (TSTAT), an energy controller, an irrigation system, a lighting system, an alarm system, a smart power outlet, an energy detection device, a garage door opening system or device, a power management device, a power measurement unit (PMU), an air handler, a wireless air damper, a humidity control system, a heat and motion sensing device, a smart power outlet, a switch router, a wireless router, an automobile or transportation device, a network communication device, or any other suitable device or system.

Figure 2:
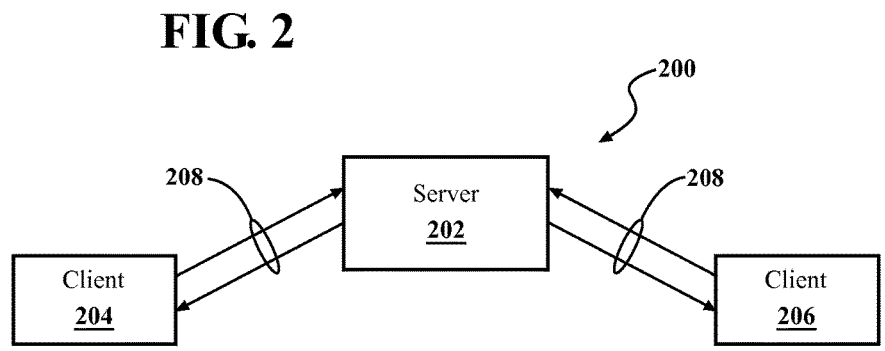
FIG. 2 illustrates a block diagram of a communication platform according to an aspect of the disclosure.

FIG. 2 illustrates a block diagram of the communication platform 200 utilized with the environment management system according to an aspect. The communication platform 200 includes at least one XMPP server 202 and a plurality of clients 204, 206 in communication with the XMMP server 202. The clients 204, 206 can be users, computers, mobile devices, network devices or the like, and a communication stream 208 establishes the communication and connection between each of the clients 204, 206 and the external XMPP server 202. In an aspect, once the communication stream 208 is established, the connection may be comprised of two separate TCP/IP connections, each of which establishes communication in separate directions. In other words, the two separate TCP/IP connections provide for bi-directional communication between the clients 204, 206 and the external XMPP server 202. In an aspect, the environment management system utilizes an instant messaging (IM) communication stream 208 to establish communication between the site 102 and the server 106. In an aspect, the instant messaging (IM) communication stream 208 utilizes an Extensible Messaging Presence Protocol (XMPP) standard to send messages within the environment management system. The Extensible Messaging and Presence Protocol (XMPP) is an open Extensible Markup Language XML protocol for near-real-time messaging, presence, and request-response services. Accordingly, the use of the communication stream 208 is a constant, always open communication stream between each of the clients 204, 206 and the external XMPP server 202 as long as each of the clients 204, 206 are connected to the external XMPP server 202.

In operation, when one of the clients 204 enters a message, hereinafter referred to as the sender client 204, the message travels from the sender client 204 to the external XMPP server 202, which then reviews the message to identify to which other client 206 the message was addressed to, hereinafter referred to as the recipient client 206. If the server 202 notices that the recipient client 206 is also connected to the external XMPP server 202, the server 202 will then proceed to send the message to the recipient client 206 via the corresponding communication stream 208. If communication streams 208 are currently established between both the sender client 204 and the external XMPP server 202 and the recipient client 206 and the external XMPP server 202, the transfer of the instant message from the sender client 204 to the recipient client 206 can occur almost instantaneously. In other words, latency in the transfer of the message via the XMPP server 202 only occurs if the recipient client 206 is not currently connected to the external XMPP server 202. In an aspect, the sender client 204 can be a mobile device operable to be used with a site of the environment management system, and the recipient client 206 can be the network device disposed at the site. Accordingly, the mobile device can send an instant message to the network device by way of the communication streams 208 and the external XMPP server 202. For example, if the network device is a thermostat, the mobile device could send a message directly to the thermostat which includes instructions to change, for example, a current or future temperature setting of the site. In an aspect, the instant message being sent could control any other network device that may be disposed at the site and that is in communication with the external XMPP server 202.

In an aspect, if both of the clients 204, 206 are associated with the same site, and are intended to communicate with each other via the external XMPP server 202, each of the clients 204, 206 will be required to initially set up an account to identify themselves as well as their intended association with the site. This set-up can occur via a webpage associated with the external XMPP server 202 or it can be done programmatically through in-band registration in which the clients 204, 206 will automatically be directed to a designated external XMPP server 202. Once at the designated external XMPP server 202, the integrated software will automatically create this registration. Once an account is set-up on the external XMPP server 202, each of the clients 204, 206 are assigned a client specific ID that includes the XMPP address, technically known in the art as a Jabber ID. Each XMPP address consists of for example, a name which serves to identify the client 204, 206 as well as an identification for the XMPP server which is currently being utilized. (e.g. client@server). In addition, each XMPP address can further include the resource that is being utilized, for example a personal computer, desktop, mobile device, network device or the like. This is useful because one client can be associated with multiple devices and can initiate communication between multiple locations with which the user may be associated with. The client specific ID's are therefore used to associate different clients together, for example, by way of the XMPP server 202. Said another way, the external XMPP server 202 manages a roster of client IDs associating and communicating with the external XMPP server 202. Once associated clients are assigned to the same roster by the external XMPP server 202, not only can instant messages be communicated between the associated clients, but a presence messaging can also be sent therebetween. In other words, instant messages can be sent to the associated client(s) within the roster that another client 204, 206 is communicating with and present via the XMPP server. As best shown in FIG. 2, a gateway device is not required to bridge communication between the clients 204, 206 and the external XMPP server 202, as well as communication between clients 204, 206 via the external XMPP server 202.

In an aspect, communication via the external XMPP server 202 can be in two separate forms: (1) request-response and (2) publish-subscribe. Request-response is defined as delivering a message directly from the sender client 204 to the receiving client 206, and then receiving a return response at the sender client 204 which is sent from the receiving client 206. The specific mechanism within XMPP for sending an instant message from the sender client 204 to the receiving client 206 is an IQ stanza. The IQ stanza will be exchanged with the instant message and serve to identify the client to which the instant message is to be delivered.

In an aspect, the publish-subscribe form of communication is best defined as publishing information from one of the clients 204 that one or more other clients 206 may currently be listening for. In this aspect, the sender client 204 who publishes the information may not even be aware who the recipient client 206 may be. For example, if the sender client 204 is a thermostat, the thermostat may publish information that a temperature at the site has increased one degree Fahrenheit or that a setting of the thermostat has been changed. Recipient clients 206 who may be interested in this information could be a mobile device associated with the thermostat, and/or a user associated with the mobile device who may like to know when the temperature of the site is increasing. Another example of the recipient client 206 could be a thermostat which is located at a vacation home, and is also interested in knowing what the temperature of the home site is, or what the setting of the home thermostat is currently set to. In this example, the sender client 204 (e.g. the thermostat) publishes that a temperature of the site has increased, and all interested recipient clients 206 in communication with the thermostat learn of this increase by way of the published instant message.

In an aspect, the publish-subscribe mode of communication can be implemented by way of a multi-user chat room mechanism (not expressly shown in FIG. 2) in which a chat room is automatically set-up when each client 204, 206 registers with the external XMPP server 202. All recipient clients 206 who are subsequently interested in monitoring a specific client can then register with the chat room associated with the sender client 204. In an aspect, the sender client 204 can also correspondingly be a recipient client 206 for other associated clients. In the publish-subscribe mode of communication, the sender client 204 publishes the message to the chat room, and then all the recipient clients 206 who are registered with that chat room would receive the sent message. The chat-room can also be used to track which recipient clients 206 are currently associated with and communicating within a specific chat room. For example, if the sender client 204 is a thermostat disposed at a site and the thermostat is monitoring what is happening within the chat room, the thermostat has knowledge of the other recipient clients 206 joined to the environment management system associated with the site. For example, if a thermostat is disposed at a home site, and a thermostat associated with a vacation site joins the chat room, then the home thermostat understands that the thermostat at the vacation site exists, and is also capable of being communicated with. Therefore, the chat room can be used to track what client(s) associated with an environment management system may be available.

Figure 3:
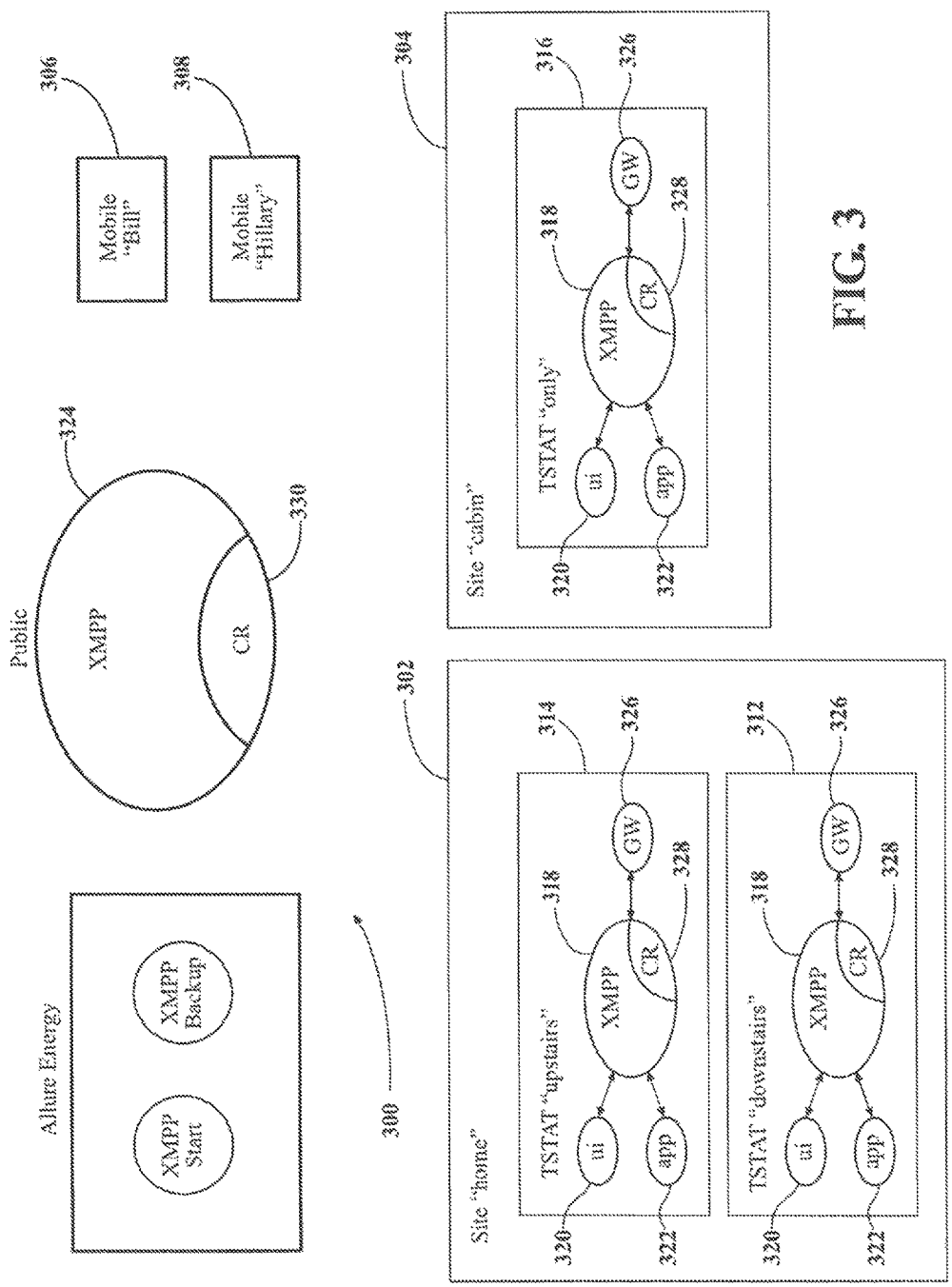
FIG. 3 illustrates a block diagram of the environment management system incorporating the communication platform according to an aspect of the disclosure.

In an aspect, as shown in FIG. 3, an environment management system 300 can include a home site 302 and a vacation site 304 which are both fixed geographic locations associated with the environment management system 300. In addition, environment management system 300 can include at least one mobile device 306, 308. As shown in FIG. 3, the at least one mobile device 306, 308 can include a first mobile device 306 and a second mobile device 308, each of which are separate clients within the environment management system 300. In an aspect, the home site 302 includes at least one network device 312, 314. For example, as shown in FIG. 3, the home site 302 can include a first thermostat 312 which is disposed downstairs within the home site 302 as well as a second thermostat 314 which is disposed upstairs within the home site 302. As also shown in FIG. 3, the vacation site 304 could also include at least one network device 316 which could also be a thermostat. Although the environment management system 300 illustrates thermostats as the network devices 312, 314, 316 disposed at both the home site 302 and the vacation site 304, as previously mentioned the network devices 312, 314, 316 could alternatively be one of or any combination of an energy management system, an energy management device, a network device, a personal computer, a consumer electronic device, a media device, a smart utility meter, an advanced metering infrastructure, a smart energy device, an energy display device, a home automation controller, an energy hub, a smart energy gateway, a set-top box, a digital media subscriber system, a cable modem, a broadband communication device, a fiber optic enabled communications device, a media gateway, a home media management system, a media server, a network server, a network storage device, a wireless speaker, a customer engagement platform, a customer engagement portal, a retail energy provider's server, a wholesale energy provider's server, a COOP energy provider's server, a retail business server, a commercial site server, an industrial site server, a multi-residential site server, a temporary lodging server, a hotel server, a motel server, a condominium server, a utility provider's server, which can include waste, water, power or combinations thereof, an energy substation, a news media server, a weather server, an advertisement server or service provider, a network radio server or service provider, a network media server or service provider, a music server or server provider, a search engine server or service provider, an information server or service provider, a wireless information network device, a vehicle charging station, a renewable energy production device, a renewable energy control device, an energy storage management system, a smart appliance, an HVAC system, a water pump, a heat pump, a hot water heater, a thermostat (TSTAT), an energy controller, an irrigation system, a lighting system, an alarm system, a smart power outlet, an energy detection device, a garage door opening system or device, a power management device, a power measurement unit (PMU), an air handler, a wireless air damper, a humidity control system, a heat and motion sensing device, a smart power outlet, a switch router, a wireless router, an automobile or transportation device, a network communication device, or any other suitable device or system.

In an aspect, as shown in FIG. 3, each of the network devices 312, 314, 316 can include an internal XMPP server 318 to facilitate communication within the network device 312, 314, 316 as well as with other network devices 312, 314, 316 and sites 302, 304 associated with the environment management system 300. In an aspect, all of the internal XMPP servers 318 associated with an environment management system 300 are federated to enable this communication. For example, if the home site 302 includes an upstairs thermostat 314 and a downstairs thermostat 312, and the vacation site 304 includes a thermostat 316, all of the internal XMPP servers 318 of these network devices 312, 314, 316 are federated to facilitate communication among one another. So, in this example, if an instant message is delivered to the downstairs thermostat 312, it can then be communicated to the upstairs thermostat 314 and/or the vacation thermostat 316 via the federated internal XMPP servers 318.

In an aspect, as shown in FIG. 3, each of the network devices 312, 314, 316 can also include a user interface 320 which is running independent of the internal XMPP server 318, as well as application software 322 which also runs independent of both the user interface 320 and the internal XMPP server 318. Each of the user interfaces 320 within the environment management system 300 have separate Jabber Identifications or JIDs. In addition, each of the internal XMPP servers 318 have an assigned domain, such as for example "local" for those internal XMPP servers 318 disposed within the home site 302. For purposes of illustration, as shown in FIG. 3, the JID of the downstairs thermostat 312 of the home site 302 could have an address of ui@downstairs.local, the JID of the upstairs thermostat 314 at the home site 302 could be ui@upstairs.local and the thermostat 316 at the vacation site 304 could be ui@downstairs.vacation. Correspondingly, the applications 322 associated with the respective network devices 312, 314, 316 could have respective addresses of app@downstairs.local, app@upstairs.local and_app@downstairs.vacation. Accordingly, instant messages can be sent within the environment management system 300 by incorporating the identification information into each instant message. For example, the user interface 320 of the downstairs thermostat 312 could send an instant message via the internal XMPP server 318 to the application 322 of the upstairs thermostat 314 by including the identification app@upstairs.local with the instant message. An example of this instant message would be to increase the temperature of the upstairs thermostat 314 two degrees. This instant message could be the direct result of a user of the home site 302 interacting with the user interface 320 of the downstairs thermostat 312 to change the temperature of the upstairs thermostat 314. As a result, this change is communicated to the application 322 that is actually responsible for making the adjustment to the temperature setting of the upstairs thermostat 314. Similarly, a message could be sent from the user interface 320 of the upstairs thermostat 316 to the application 322 of the downstairs thermostat 312 to change the temperature setting of the downstairs thermostat 312. This would be an example of a request-response mode of communication described previously. In another aspect, the communication between the downstairs thermostat 312 and the upstairs thermostat 314 of the home site 302 can occur through a wireless LAN disposed at the home site 302.

In a publish-subscribe mode of communication within the environment management system 300 of FIG. 3, if a change is initiated to an operating condition of one of the network devices 312, 314, 316, this change can be communicated among the federated internal XMPP servers 318 so that each of the network devices 312, 314, 316 is aware of the change. For example, if a setting of the downstairs thermostat 312 is increased two degrees, the application 322 of the downstairs thermostat 312 could communicate the setting change to the upstairs thermostat 314 and the vacation thermostat 316 via the internal XMPP servers 318. Further, by including ui@upstairs.local and ui@downstairs.vacation with the message, the setting change can be displayed on the user interface 320 of the upstairs thermostat 314 and the vacation thermostat 316 for viewing by a user at each of these sites 302, 304.

In an aspect, the network devices 312, 314, 316 can communicate with the mobile devices 306, 308 associated with the environment management system 300 via an external XMPP server 324 disposed remotely from each of the sites 302, 304. As previously discussed in conjunction with FIG. 2, if a client desires to communicate with an external XMPP server 324, each of the clients will be required to set up an account to identify the client as well as their association with other clients that are associated with the site. For example, in the environment management system 300 shown in FIG. 3, each of the upstairs thermostat 312, the downstairs thermostat 314 and the vacation thermostat 316 would be required to initially set up an account with the external XMPP server 324 which would identify the network device 312, 314, 316 as well as their association with other network devices 312, 314, 316 within the environment management system 300. The same account set-up would apply to the mobile devices 306, 308. At the time of initial registration, an XMPP account associated with the environment management system 300 is created on the external XMPP server 324 along with an associated chat room 328. This account and chat room 328 for each of the network devices 312, 314, 316 and mobile devices 306, 308 will be maintained on the external XMPP server 324 as long as the external XMPP server 324 remains in existence.

In an aspect, the mobile devices 306, 308 can also communicate with the network devices 312, 314, 316 of the environment management system 300 by way of the external XMPP server 324. As previously mentioned, if a mobile device 306, 308 desires to communicate within the environment management system 300 via the external XMPP server 324, each of the mobile devices 306, 308 will also be required to set up an account to identify the mobile device 306, 308 as well as their association with other network devices 312, 314, 316 of the environment management system 300. For example, in the environment management system 300 shown in FIG. 3, if a first mobile device 306 and a second mobile device 308 would like to be associated with the environment management system 300, the mobile devices 306, 308 are each assigned separate mobile identifications such as mobile@neko.im/1 and mobile@neko.im/2. Once these mobile identifications are assigned and the mobile devices 306, 308 are associated with the environment management system 300, each of the mobile devices 306, 308 can send messages to any of the other clients, or network devices. For example, if the first mobile 306 device desires to adjust the temperature of the downstairs thermostat 312 two degrees, the first mobile device 306 could send the message along with the identification of app@downstairs.local. This message will then be communicated through the external XMPP server 324 to the internal XMPP server 318 disposed on the downstairs thermostat 312 and then to the application 322 of the downstairs thermostat 312 which will then take the necessary steps to initiate the change.

In an aspect, the instant message from the mobile devices 306, 308 is sent from the external XMPP server 324 to a gateway 326 which is operated by one of the network devices 312, 314, 316 disposed within the environment management system 300. In other words, as best shown in FIG. 3, the gateway 326 has two XMPP addresses, both an internal XMPP gateway address and an external XMPP gateway address (not expressly shown in FIG. 3), and thus serves to function as a relay between the internal XMPP servers 318 and the external XMPP server 324. In other words, instant messages which come from the external XMPP server 324 are sent to the external gateway address of the gateway 326, which then communicates the message to the internal XMPP servers 318 of the network devices 312, 314, 316. Similarly, a message which is sent from the network devices 312, 314, 316, and intended for the delivery to one of the mobile devices 306, 308 is first communicated to the internal gateway address of the gateway 326, which then communicates the instant message to the external XMPP server 324 for delivery to the respective mobile device 306, 308. In other words, as best shown in FIG. 3, the environment management system 300 does not require a separate gateway device. Further, in an aspect, the environment management system 300 includes only one gateway 326 which includes an external XMPP gateway address identified by the user's name, the site location of the gateway 326 as well as an identification associated with the external XMPP server 324 to which it will be communicating. For example, the gateway 326 associated with the home site 302 of the environment management system 300 of FIG. 3 could include an external XMPP gateway address of username@neko.im/home. In addition, the gateway 326 associated with the vacation site 304 of the environment management system 300 of FIG. 3 could include an external XMPP gateway address of username@neko.im/vacation. Further, as best shown in FIG. 3, if the upstairs thermostat 314 is operating the gateway 326 for the home site 302, the internal XMPP gateway address of the home site 302 could be gw@upstairs.local. Correspondingly, if the downstairs thermostat 316 of the vacation site 304 is operating the gateway 326 for the vacation site 304, the internal XMPP gateway address of the vacation site 304 could be gw@downstairs.local. It should be understood that these internal and external XMPP gateway address would correspondingly change depending on which network device is currently operating the gateway 326.

As previously mentioned, in an aspect, the environment management system 300 includes only one gateway 326 per site. In this aspect, one of the network devices 312, 314, 316 for each site will include the gateway 326. In operation, when a network device 312, 314, 316 is joined with a site 302, 304, it will first look to see if another network device 312, 314, 316 is currently running the gateway 326. If a gateway 326 is running on another network device 312, 314, 316, the network device which joins the site 302, 304 will take no action. However, if the network device 312, 314, 316 determines that a gateway 326 is not currently running at the corresponding site 302, 304, the network device 312, 314, 316 will implement the gateway 326. As shown in FIG. 3, the upstairs thermostat 314 of the environment management system 300 is currently shown as running the gateway 326. However, as indicated by phantom lines, the downstairs thermostat 312 also includes the capability to initiate the gateway 326 should the upstairs thermostat 314 no longer be joined with the home site 302, or the gateway 326 of the upstairs thermostat 314 goes offline or is damaged. In other words, even though the downstairs thermostat 312 may not initiate the gateway 326 upon joining the home site 302, the downstairs thermostat 312 is configured to constantly monitor for the presence of a gateway 326, or lack thereof, to implement the gateway 326 if one is needed.

In an aspect, the mechanism used within the environment management system 300 to determine if other network devices 312, 314, 316 exist, and/or one of the network devices 312, 314, 316 is currently operating the gateway 326 is known as zero configuration network, or multi-cast DNS (not expressly shown). This is a technology for broadcasting on a local LAN to discover what network devices 312, 314, 316 and/or gateways 326 are in communication within the environment management system 300. Accordingly, in the environment management system 300 as shown in FIG. 3, the downstairs thermostat 312 can use multi-cast DNS to determine if other network devices 312, 314, 316, such as the upstairs thermostat 314 are present, and also if any of the other network devices 312, 314, 316 are currently providing the gateway 326. Accordingly, the multi-cast DNS functionality enables the easy location of other network devices 312, 314, 316 within the site 302, 304, and plays a role in supporting the federation concept for the internal XMPP servers 318.

In an aspect, if a network device 312, 314 disposed at the home site 302 is interested in sending an instant message to a network device 316 at the vacation site 304, the instant message will be sent to the internal XMPP address of the gateway 326, and included in the instant message will be identification information to identify who the instant message needs to be delivered to, e.g. ui@downstairs.vacation. This aspect of communication provides a way to federate external XMPP servers 324 which was not possible in the prior art communication platforms. In other words, the at least one gateway 326 within the environment management system 300 represents a specific site, e.g. home site 302 and vacation site 304, and is the only device in the environment management system 300 which is capable of communicating with two separate XMPP connections. In other words, the gateway 326 is continuously looking for instant messages that are being addressed to any other device 312, 314, 316 within the associated site 302, 304, and receives these instant messages and delivers them to the intended recipients. More specifically, in an aspect, the external XMPP server 324 will determine that a message is intended to be sent to the home site 302, and forward the message to the gateway 326 associated with the home site 302. Subsequently, the gateway 326 will locate the instant message and forward the message across the federated internal XMPP servers 318 disposed at the home site 302 to the intended recipient.

In an aspect, the network devices 312, 314, 316 of the environment management system 300 can communicate across multiple sites 302, 304. For example, as shown in FIG. 3, the downstairs thermostat 312 may be interested in communicating with the downstairs thermostat 316 disposed at the vacation site 304. This communication could include a user entering a new set-point on the user interface 320 of the downstairs thermostat 312 to be used for a set-point for the downstairs thermostat 316 disposed at the vacation site 304. In this aspect, since the message needs to be communicated across the external XMPP server 324, the message will be addressed to the internal XMPP gateway address of the gateway 326 at the vacation site 304. In this example, as previously discussed and shown in FIG. 3, since the upstairs thermostat 314 is shown as operating the gateway 326, the message will be addressed to gw@upstairs.local, i.e., the internal XMPP gateway address corresponding to the upstairs thermostat 314. The gateway 326 operated by the upstairs thermostat 314 will then forward the message to whoever is best informed to handle the message. In this example, since the message will also be addressed to the thermostat 316 at the vacation site 304, i.e., the intended recipient of the command, the message will also include the identification, app@downstairs.vacation. Accordingly the gateway 326 of the upstairs thermostat 314 will know to forward the message to the external XMPP server 324 for subsequent delivery to the gateway 326 at the vacation site 304. Accordingly, the gateway's role in the environment management system 300 is the management of the request-response messages amongst the network devices 312, 314, 316. As is understood, the request-response message discussed in the previous example can include or be between any combination of network devices 312, 314, 316 disposed at the sites 302, 304.

In an aspect, each of the gateways 326 manage a system map (not expressly shown) which identifies all of the network devices 312, 314, 316, mobile devices 306, 308 and sites 302, 304 disposed within an environment management system 300. The system map allows the gateway 326 to quickly understand where network devices 312, 314, 316 and mobile devices 306, 308 are located so that the gateway 326 recognizes when to send a message outside of the respective site 302, 304. For example, with reference to FIG. 3, if an instant message is sent from the downstairs thermostat 312 and is intended to be delivered to the first mobile device 306, the gateway 326 needs to understand if the mobile device 306 is located within the home site 302 or if is located away from the home site 302. The system map provides this functionality to the gateway 326, and in this example, would assist the gateway 326 in making the decision to send the instant message to the external XMPP server 324 for ultimately delivery to the first mobile device 306. If the answer is no, then the gateway 326 initiates the forwarding of the message to the external XMPP server 324 for subsequent delivery to the intended recipient.

In an aspect, the mobile devices 306, 308 of the environment management system 300 are always connected to the external XMPP server 324 even if they may be located within one of the sites 302, 304. However, in an aspect, when the mobile device 306, 308 enters a site 302, 304, the mobile device 306, 308 can be configured to initiate a search for the internal XMPP server 318 currently operating at the respective site 302, 304 for purposes of communicating via the internal XMPP server 318 instead of the external XMPP server 324. This leads to increased efficiencies of communication between the network devices 312, 314, 316 of the site 302, 304 and the mobile device 306, 308 because the mobile device 306, 308 is no longer required to communicate with the external XMPP server 324.

In an aspect, as the previously discussed, the publish-subscribe mode of communication between the network devices 312, 314, 316, the mobile devices 306, 308 and the sites 302, 304 is accomplished by way of chat-rooms. As shown in FIG. 3, each of the internal XMPP servers 318 within the energy management system 300 includes a chat room 328 for publishing information to all network devices 312, 314, 316 and mobile devices 306, 308 who may have joined the chat room 328. For purposes of illustration, with reference to FIG. 3, if the application 322 of the upstairs thermostat 314 changes the temperature setting, this instant message will be sent to the chat-room 328 disposed on the internal XMPP server 318 of the upstairs thermostat 316 for publication to all other network devices 312, 314, 316, mobile devices 306, 308 and sites 302, 304 within the environment management system 300 who may be interested in this change, e.g. a user interface 320 of the downstairs thermostat 312 at the home site 302. In addition, as shown in FIG. 3, the gateway 326 is in communication with the chat-room 328 of the upstairs thermostat 314, and thus when the gateway 326 learns of the change to the setting of the upstairs thermostat 314, it will relay this information to the gateway 326 of the vacation site 304 for communication to any devices that are also communication with this chat-room. In addition, the mobile devices 306, 308 of the environment management system 300 can be in communication with the chat-room 328 of the upstairs thermostat 314 by way of a chat-room 330 disposed on the external XMPP server 324. Thus the mobile devices 306, 308 are also informed of the changed thermostat setting. In other words, the chat room 328 of the upstairs thermostat 314 communicates the setting change to the chat room 330 of the external XMPP server 324, which then can be communicated to the mobile devices 306, 308 joined to this chat room 330. As can be seen from the previous examples, the gateway 326 of the environment management system 300 provides a communication link for both the request-response and the publish-subscribe modes of communication.

According to a further aspect, the use of the gateway 326 to establish "federation" of the network devices 312, 314, 316 at the site 302, 304 with the external XMPP server 324 does not require that the gateway 326 have a public address on the internet and can also allow an open port to the external XMPP server 324. In addition, the internal XMPP servers 318 disposed on each of the network devices 312, 314, 316 utilize DNS resolution to locate the other associated network devices 312, 314, 316 and mobile devices 306, 308. Further, in a preferred arrangement, the DNS product will be a multi-cast DNS Linux product running on each internal XMPP server 318 of the network devices 312, 314, 316.

As previously mentioned, in an aspect, each of the network devices 312, 314, 316 includes a system map (not expressly shown) to identify the other devices associated with a site 302, 304 and the environment management system 300. In other words, a user is not required to enter all of the information with regard to the associated devices, but rather each network device 312, 314, 316 or mobile device 306, 308 when registering with the site 302, 304 will automatically determine all of the other network devices 312, 314, 316 associated with the site 302, 304.

As previously mentioned, the mobile devices 306, 308 are configured to communicate with both the external XMPP server 324 and the internal XMPP server 318. In an aspect, the mobile devices 306, 308 can communicate with the external XMPP server 324 and the internal XMPP server 318 using a WIFI or 802.11 based communication, Bluetooth communication, Zigbee communication, or various other wireless communications, or any combination thereof. According to a further aspect, mobile devices 306, 308 can communicate with the external XMPP server 324 and the internal XMPP server 318 using a subscriber based wireless data communication network such as a 3G network, 4G network, EDGE network, a cellular network, WiMAX, other wireless data communication, or any combination thereof.

Note that not all of the activities described above in the general description or the examples are required, that a portion of a specific activity may not be required, and that one or more further activities may be performed in addition to those described. Still further, the order in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An environment management system comprising:
at least one fixed geographic site;
a communication platform disposed remotely from said site and including at least one external XMPP server;
a plurality of network devices physically located at said site and at least some of the plurality of network devices each including an internal XMPP server that is federated with another internal XMPP server; and
at least one mobile device configured to:
communicate with and alter an operating condition of the plurality of network devices via the external XMPP server, and
in response to entering the site, initiating a search to communicate with and alter the operating condition of the at least one of some of the plurality of network devices including the internal XMPP via the internal XMPP server;
said at least one external XMPP server including:
at least one memory storing instructions, and
at least one processor capable of executing the stored instructions to:
communicatively couple with each of said plurality of network devices via an instant message communication stream, said stream comprising two separate TCP/IP connections for each of said plurality of network devices to establish communication between each of said plurality of network devices and said external XMPP server in opposing directions,
receive information from each of said plurality of network devices including identification information and intended association with said site,
assign a network device specific ID including an identification of the external XMPP server to each of said plurality of network devices based on the received information, and
utilize an Extensible Message Presence Protocol (XMPP) standard to communicate with and alter an operating condition of said at least one of said plurality of network devices located at said site via said instant communication stream based on the assigned network device specific IDs.

2. The system of claim 1, wherein said at least one of the plurality of network devices and the at least one mobile device includes a sender network device and at least one recipient network device each independently and communicatively coupled to said at least one external XMPP server via a separate instant message communication stream.

3. The system of claim 2, further comprising:
wherein said sender network device is configured to initiate an instant message to said external XMPP server via said respective instant message communication stream, said instant message including an altered operating condition for said at least one recipient network device;
wherein said external XMPP server is configured to receive said instant message sent from said sender network device and to forward said instant message to said at least one recipient network device via said respective instant messaging communication stream; and
wherein said recipient network device is configured to implement said altered operating condition included within the instant message.

4. The system of claim 1 wherein said external XMPP server is further configured to create and manage a roster of network device IDs for said site, said roster of network device IDs including a list of each of said network device specific IDs associated with the site.

5. The system of claim 2, wherein each of said separate instant message communication streams comprise a publish-subscribe instant message communication stream.

6. The system of claim 5, wherein each of said publish-subscribe instant message communication streams is associated with a multi-user chat room mechanism.

7. The system of claim 6, wherein said multi-user chat room mechanism is configured to automatically set-up when said sender network device registers with said external XMPP server.

8. The system of claim 7, wherein said multi-user chat room mechanism is configured to register each of said at least one recipient network devices associated with said sender network device for allowing said sender network device to publish a message within said multi-user chat room mechanism to all of said registered recipient network devices.

9. The system of claim 8, wherein said multi-user chat room mechanism is configured to track said registered recipient network devices.

10. The system of claim 2, wherein each of said separate instant message communication streams comprise a request-response instant message communication stream.

11. The system of claim 2, wherein the at least one of the plurality of network devices including the internal XMPP server includes each of said sender network device and said at least one recipient network device and wherein at least one of said internal XMPP servers includes a gateway, said gateway having both an internal XMPP server address and an external XMPP address and said gateway further managing a system map that identifies all of said plurality of network devices and said at least one site within said environment management system.

12. The system of claim 11, wherein each of said internal XMPP servers are federated internal XMPP servers to facilitate communication of said instant messages between said sender network device and said at least one recipient network device.

13. The system of claim 1, wherein the at least one mobile device associated with said site and configured to communicate with and alter the operating condition of said at least one network device by way of said external XMPP server through use of said instant message communication stream.

14. The system of claim 1, wherein said mobile device is configured to communicate with said internal XMPP server and said external XMPP server using at least one of a WIFI or 802.11 based communication, a Bluetooth based communication, a Zigbee based communication, a subscriber based wireless data based communication, or a WiMax based communication.

15. The system of claim 1, wherein said at least one network device located at said site includes the internal XMPP server that is configured to search for a gateway of said site and to implement a gateway for said site if one does not exist, and wherein said gateway includes an internal XMPP gateway address and an external XMPP gateway address and said gateway further managing a system map that identifies all of said plurality of network devices and said at least one site within said environment management system, said gateway enabling federation of said external XMPP server with said internal XMPP server.

16. The system of claim 15, wherein said gateway is configured to search for instant messages addressed to at least one recipient network device associated with said site and further configured to deliver said instant message to said at least one recipient network device.

17. The system of claim 1, wherein said at least plurality of network devices includes at least one of a personal computer, a PDA, a consumer electronic device, a media device, a smart phone, a cellular or mobile phone, a smart utility meter, an advanced metering infrastructure, a smart energy device, an energy display device, a home automation controller, an energy hub, a smart energy gateway, a set-top box, a digital media subscriber system, a cable modem, a fiber optic enabled communications device, a media gateway, a home media management system, a network server or storage device, an energy substation, a vehicle charging station, a renewable energy production device, a renewable energy control device, an energy storage management system, a smart appliance, an HVAC system, a water pump, a heat pump, a hot water heater, a thermostat, an energy controller, an irrigation system, a lighting system, an alarm system, a smart power outlet, an energy detection device, a power measurement device, a power measurement unit (PMU), an air handler, a wireless air damper, a humidity control system, a heat and motion sensing device, a smart power outlet, a switch router, or a wireless router.

* * * * *